(12) United States Patent
Mossoba et al.

(10) Patent No.: US 10,708,260 B1
(45) Date of Patent: Jul. 7, 2020

(54) METHOD AND SYSTEM FOR DETECTING TWO-FACTOR AUTHENTICATION

(71) Applicant: Capital One Services, LLC, McLean, VA (US)

(72) Inventors: Michael Mossoba, Arlington, VA (US); Joshua Edwards, Philadelphia, PA (US); Jason Ji, Reston, VA (US); Ljubica Chatman, New York, NY (US); Carlos Eduardo Rodriguez, Fairfield, CT (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/224,334

(22) Filed: Dec. 18, 2018

(51) Int. Cl.
*H04L 29/06* (2006.01)
*G06F 9/54* (2006.01)

(52) U.S. Cl.
CPC ............ *H04L 63/083* (2013.01); *G06F 9/547* (2013.01)

(58) Field of Classification Search
CPC ............................... H04L 63/083; G06F 9/547
See application file for complete search history.

(56) References Cited

U.S. PATENT DOCUMENTS

| 2016/0164880 | A1* | 6/2016 | Colesa | H04L 63/105 726/1 |
| 2017/0118215 | A1* | 4/2017 | Varadarajan | H04L 63/0236 |
| 2018/0165115 | A1* | 6/2018 | Fusaro | H04L 63/08 |
| 2018/0267847 | A1* | 9/2018 | Smith | G06F 9/547 |

* cited by examiner

*Primary Examiner* — Meng Li
(74) *Attorney, Agent, or Firm* — DLA Piper LLP (US)

(57) ABSTRACT

Embodiments disclosed herein generally related to a system and method for assessing a fraud risk. In one embodiment, a method for assessing a fraud risk is disclosed herein. A web browser extension executing on the computing device identifies an account associated with the computing device. The web browser extension detects that the computing device navigated to a web page hosted by a third party server. The web browser extension determines that the third party server prompted the computing device to opt into two-factor authentication functionality. The web browser extension determines that the computing device did not opt into the two-factor authentication functionality. The web browser extension prompts, via an application programming interface (API), an organization computing system to update a fraud metric associated with the account.

20 Claims, 6 Drawing Sheets

METHOD AND SYSTEM FOR DETECTING TWO-FACTOR AUTHENTICATION

FIELD OF THE DISCLOSURE

Embodiments disclosed herein are generally related to a method and system for detecting two-factor authentication, and, more specifically, to a method and system of assessing risk through analyzing use of two-factor authentication.

BACKGROUND

Many users access information on the Internet using software applications known as web browser applications. Web browser applications interpret the various languages in which information on the Internet is written, such as hypertext markup language (HTML) or an extensible markup language (XML), to provide the information to users in a user-readable format. Additional functionality may be added to web browsers by browser extension applications. A browser extension application is a software application made to be downloaded by a user and installed on the user's computing device to offer additional features to the browser. When the user accesses the Internet through a web browser application, the browser extension application provides the user with additionally functionality within the web browser application.

SUMMARY

Embodiments disclosed herein generally related to a system and method for assessing a fraud risk. In one embodiment, a method for assessing a fraud risk is disclosed herein. A web browser extension executing on the computing device identifies an account associated with the computing device. The web browser extension detects that the computing device navigated to a web page hosted by a third party server. The web browser extension determines that the third party server prompted the computing device to opt into two-factor authentication functionality. The web browser extension determines that the computing device did not opt into the two-factor authentication functionality. The web browser extension prompts, via an application programming interface (API), an organization computing system to update a fraud metric associated with the account.

In some embodiments, prompting, by the web browser extension via the API, the organization computing system to update the fraud metric associated with the account includes the web browser extension increasing a sensitivity of a fraud algorithm associated with the account.

In some embodiments, increasing the sensitivity of the fraud algorithm associated with the account, comprises includes the web browser extension determining that the type of website is a website associated with a financial institution and increasing the sensitivity of the fraud algorithm associated with the account by a first amount.

In some embodiments, increasing the sensitivity of the fraud algorithm associated with the account includes the web browser extension determining that the type of website is a website not associated with a financial institution increasing the sensitivity of the fraud algorithm with the account by a first amount that is less than an amount associated with a financial institution website.

In some embodiments, the web browser extension further receives a message from the organization computing system to be transmitted to the computing device. The message includes a suggestion to opt into two-factor authentication. The web browser extension further prompts, via the web browser extension, a user of the computing device to opt into two-factor authentication.

In some embodiments, the web browser extension detects that the computing device has opted into two-factor authentication functionality following receipt of the message. The web browser extension prompts, via the API, the organization computing system to further update the fraud metric associated with the account.

In some embodiments, the web browser extension prompting, via the API, the organization computing system to further update the fraud metric associated with the account includes the web browser extension prompting organization computing system to decrease a sensitivity of a fraud algorithm associated with the account.

In another embodiment, a system is disclosed herein. The system includes a processor and a memory. The processor executes a web browser extension. The memory has programming instructions and the web browser extension stored thereon, the web browser extension, when executed by the processor, performs an operation. The operation includes identifying, by the web browser extension, an account associated with the computing device. The operation further includes detecting, by the web browser extension, that the computing device navigated to a web page hosted by a third party server. The operation further includes determining, by the web browser extension, that the third party server prompted the computing device to perform an authorization operation. The operation further includes determining, by the web browser extension, that the authorization operation with the third party server does not include two-factor authentication functionality. The operation further includes prompting, via an application programming interface (API), an organization computing system to update a fraud metric associated with the account.

In some embodiments, the operation of prompting, via the API, the organization computing system to update the fraud metric associated with the account includes increasing a sensitivity of a fraud algorithm associated with the account.

In some embodiments, the operation of increasing the sensitivity of the fraud algorithm associated with the account includes determining that the type of website is a website associated with a financial institution and increasing the sensitivity of the fraud algorithm associated with the account by a first amount.

In some embodiments, the operation of increasing the sensitivity of the fraud algorithm associated with the account includes determining that the type of website is a website not associated with a financial institution and increasing the sensitivity of the fraud algorithm with the account by a first amount that is less than an amount associated with a financial institution website.

In some embodiments, the operation further includes receiving a message from the organization computing system to be transmitted to the computing device. The message includes a suggestion to opt into two-factor authentication. In some embodiments, the operation further includes prompting, by the web browser extension, a user of the computing device to opt into two-factor authentication.

In some embodiments, the operation further includes detecting, by the web browser extension, that the computing device has opted into two-factor authentication functionality following receipt of the message. The operation further includes prompting, via the API, the organization computing system to further update the fraud metric associated with the account.

In some embodiments, the operation of prompting, by the web browser extension via the API, the organization computing system to further update the fraud metric associated with the account includes decreasing a sensitivity of a fraud algorithm associated with the account.

In another embodiment, a method for assessing a fraud risk is disclosed herein. A web browser extension application executing on a computing device determines an account associated with the computing device. The web browser extension detects that the computing device navigated to a web page hosted by a third party server. The web browser extension identifies a document object model generated by a web browser executing on the computing device. The web browser extension parses the document object model to determine whether the computing device has opted into two-factor authentication functionality with the third party web server. The web browser extension determines that the computing device did not opt into the two-factor authentication functionality. The web browser extension notifies organization computing system that the computing device did not opt into two-factor authentication functionality.

In some embodiments, the document object model is an object oriented representation of the web page.

In some embodiments, the web browser extension parsing the document object model to determine whether the computing device has opted into two-factor authentication functionality with the third party web server includes the web browser extension injecting JavaScript associated therewith into the web page.

In some embodiments, the web browser extension determining that the computing device did not opt into the two-factor authentication functionality includes the web browser extension identifying a pop-up window corresponding to an authorization request between the computing device and the third party server and determining that the authorization request did not include instructions for two-factor authentication functionality.

In some embodiments, the web browser extension receives, from the organization computing system, a message to be displayed to the computing device. The message includes a suggestion to opt into two-factor authentication functionality. The web browser extension requests that the web browser render the message for display.

In some embodiments, the web browser extension determines that the computing device opted into the two-factor authentication functionality. The web browser extension notifies the organization computing system that the computing device opted into two-factor authentication functionality.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein are generally directed to a system and method for assessing a fraud risk. For example, one or more techniques disclosed herein leverage a web browser extension that is able to detect a user's cyber security behavior. As hacking becomes ever more prevalent in the digital age, the need for users to protect various online accounts continues to increase. A common tactic that may be used to defend accounts against fraudulent individuals is two-factor authentication functionality. When two-factor authentication functionality is utilized, a computer system grants a user access to an account only after the user successfully provides two or more pieces of evidence to an authentication mechanism. Typically, forms of two-factor authentication includes (1) a user successfully providing log-in credentials (e.g., user name and password) to a server; and (2) the user successfully providing a code transmitted to a device that user has control over (e.g., cell-phone, computer, etc.). It is only after each successful authentication attempt that the user is able to gain access to his or her account.

The one or more techniques disclosed herein assess a fraud risk associated with a particular user based on whether the user takes advantage of two-factor authentication functionality with his or her accounts. This may be achieved using a web browser extension that searches script of each web page to determine if the user was indeed prompted with a two-factor authentication prompt. Based on this determination, the system may update a fraud metric associated with the user.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
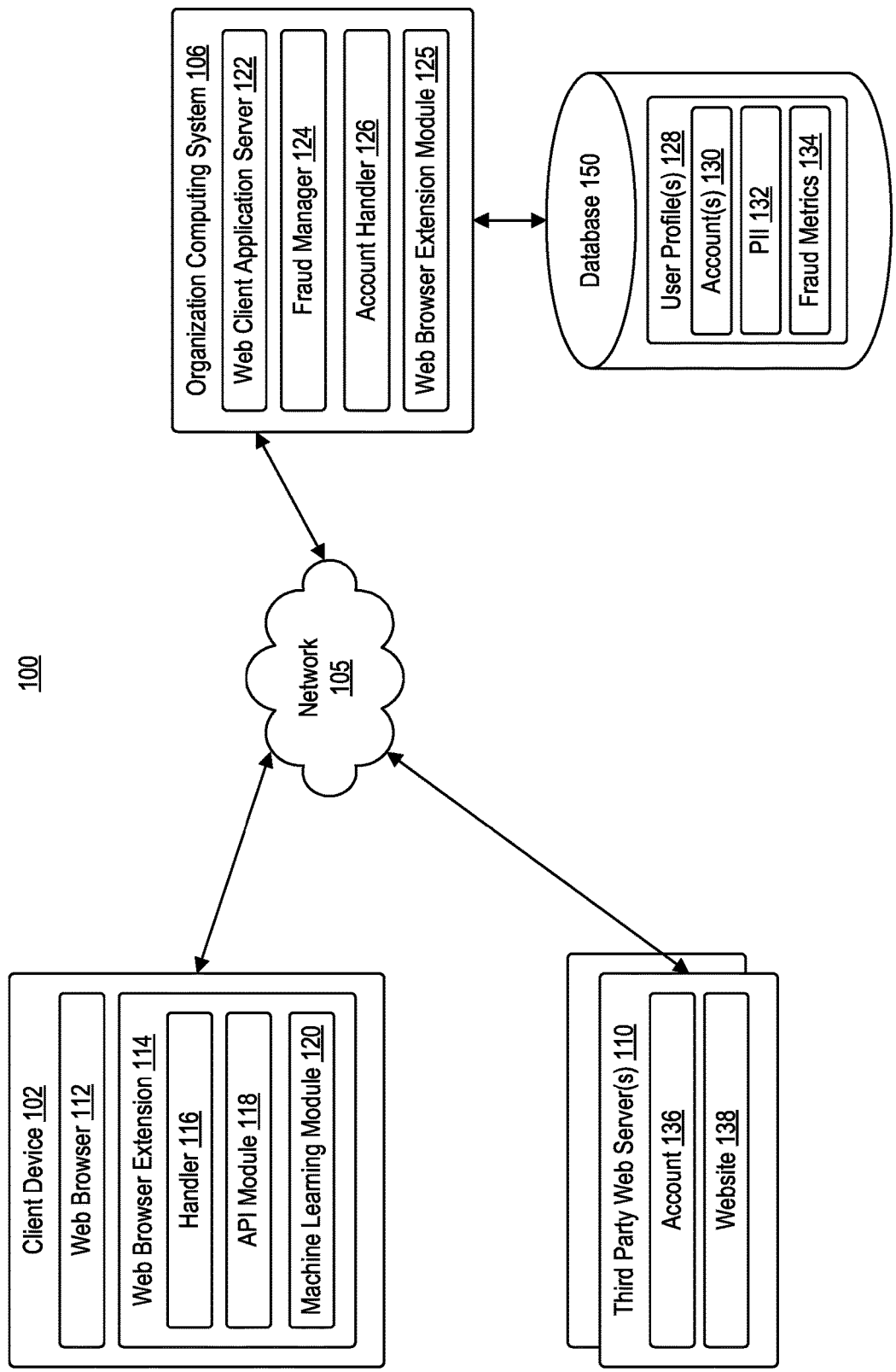
FIG. 1 is a block diagram illustrating a computing environment, according to example embodiments.

FIG. 1 is a block diagram illustrating a computing environment 100, according to example embodiments. Computing environment 100 may include at least client device 102, organization computing system 106, and one or more third party web servers 110 communicating over network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receive information between the components of system 100.

Client device 102 may be operated by a user. For example, client device 102 may be a mobile device, a tablet, a desktop computer, or any computing system having the capabilities described herein. Client device 102 may belong to or be provided to a customer (e.g., user) or may be borrowed, rented, or shared. Customers may include individuals such as, for example, subscribers, clients, prospective clients, or customers of an entity associated with organization computing system 106, such as individuals who have obtained, will obtain, or may obtain a product, service, or consultation from an entity associated with organization computing system 106.

Client device 102 may include at least web browser 112 and browser extension 114. Web browser 112 may be one or more software applications configured to perform operations consistent with providing web pages. In operation, client device 102 may communicate over network 105 to request a webpage, for example, from one or more third party web servers 110 or web client application server 122. For example, client device 102 may be configured to execute web browser 112 to access content managed by web client application server 122. The content that is displayed to client device 102 may be transmitted from a third party web server 110 to client device 102, and subsequently processed by web browser 112 for display through a display associated with a client device 102.

Browser extension 114 may work in conjunction with web browser 112. For example, browser extension 114 may be one or more software applications configured to perform operations consistent with detecting fields in web pages, such as payment fields in web pages associated with merchants. Browser extension 114 may be further configured to perform operations consistent with populating fields in web pages with, for example, secure tokens mapped to financial service accounts. Browser extension 114 may be further configured to detect whether a user of client device 102 has opted into two-factor authentication with one or more third party web servers 110. For example, browser extension 114 may be configured to perform operations consistent with detecting whether the user was prompted with two-factor authentication requests, whether the user opted into two-factor authentication functionality, and whether the user has chosen not to opt into two-factor authentication functionality.

Browser extension 114 may include at least handler 116, application programming interface (API) module 118, and machine learning module 120. Each of handler 116, application programming interface (API) module 118, and machine learning module 120 may be comprised of one or more software modules. The one or more software modules may be collections of code or instructions stored on a media (e.g., memory of client device 102) that represent a series of machine instructions (e.g., program code) that implements one or more algorithmic steps. Such machine instructions may be the actual computer code the processor of client device 102 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Handler 116 may be configured to review the script (e.g., HTML, XML) of a web page for one or more fields associated with two-factor authentication functionality. For example, handler 116 may review one or more identifiers for prompts in the script to search for identifiers pertaining to two-factor authentication functionality. Upon detecting such identifiers, handler 116 may identify whether the user has, for example, two-factor authentication functionality turned on, ignored a prompt to opt into two-factor authentication functionality, navigated to a web page to opt into two-factor authentication functionality, and the like. Further, in some embodiments, handler 116 may be configured to identify a type of organization associated with the web page. For example, based on one or more identifiers in the script of the web page, handler 116 may be able to determine that the web page is associated with a financial organization (e.g., bank, loan provider, credit card company, etc.), a social media organization, and the like.

Handler 116 is able to easily identify one or more identifiers in scripts that correspond to two-factor authentication functionality using a prediction model trained by machine learning module 120. Machine learning module 120 may include one or more computer systems configured to train a prediction model used by handler 116. To train the prediction model, machine learning module 120 may use an Internet bot to scour scripts of various web pages to generate a training set. The training set may include one or more identifiers that are found in a script of a web page. Such identifiers may include, for example, those identifiers that correspond to two-factor authentication functionality. Machine learning module 120 may implement one or more machine learning algorithms to train the prediction model using the training set. For example, machine learning module 120 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like.

API module 118 may be configured to interface with organization computing system 106. For example, web browser extension 114 may communicate with organization computing system 106 via API module 118. API module 118 may be configured to execute one or more APIs that provide various functionalities related to the operations of organization computing system 106. In some embodiments, API module 118 may include an API adapter that allows API module 118 to interface with and utilize enterprise APIs maintained by web browser extension 114 and/or an associated entity that may be housed on other systems or devices. In some embodiments, APIs may enable functions that include, for example, transmitting one or more two-factor authentication indications to organization computing system 106.

Organization computing system 106 may include web client application server 122, fraud manager 124, web browser extension module 125, and account handler 126. Web client application server 122 may be configured to store one or more web pages accessible by one or more remote computing devices. For example, web client application server 122 may include one or more web pages that may be accessed by client device 102 via web browser 112.

Each of fraud manager 124, web browser extension module 125, and account handler 126 may be comprised of one or more software modules. The one or more software modules may be collections of code or instructions stored on a media (e.g., memory of organization computing system 106) that represent a series of machine instructions (e.g., program code) that implements one or more algorithmic steps. Such machine instructions may be the actual computer code the processor of organization computing system 106 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Web browser extension module 125 may be configured to interface with web browser extension 114 via one or more APIs. For example, web browser extension 114 may communicate client security information with web browser extension module 125 via API module 118 to notify organization computing system 106 whether, for example, the user has opted into two-factor authentication for various websites.

Web browser extension module 125 may communicate such information to fraud manager 124. Fraud manager 124 may use such information (e.g., client security information) as part of an overall fraud algorithm. For example, upon receiving an indication that the user has not opted into two-factor authentication for a particular website, fraud manager 124 may update a fraud metric in the fraud algorithm. In this case, fraud manager 124 may increase a sensitivity of the fraud metric in the fraud algorithm, such that the fraud algorithm may be more sensitive to potential fraudulent transactions.

In some embodiments, the degree to which fraud manager 124 may update a fraud metric in the fraud algorithm may not only depend on whether the user has opted into two-factor authentication on various websites, but also the type of websites the user has opted into or chosen to not opt into. For example, if fraud manager 124 receives an indication from web browser extension 114 that the user has chosen not to opt into two-factor authentication on a financial website (e.g., the user's bank), fraud manager 124 may increase the sensitivity of a fraud metric a greater degree compared to websites that host less sensitive information, such as a fantasy football account.

Further, in some embodiments, fraud manager 124 may be configured to generate one or more recommendations to client device 102, based on the one or more websites for which the user has opted into two-factor authentication functionality. For example, fraud manager 124 may work in conjunction with web browser extension 114 to push one or more recommendation messages to client device 102. The one or more recommendation messages may prompt the user to opt into two-factor authentication on certain websites.

Organization computing system 106 may be configured to communicate with database 150 via account handler 126. Database 150 may include one or more user profiles 128. Each user profile 128 may correspond to a respective user of the organization associated with organization computing system 106, such as a user of client device 102. Each user profile 128 may include one or more accounts 130, personal identification information 132 and one or more fraud metrics 134.

Each account 130 may correspond to a respective financial account with the organization. For example, within user profile 128 may be one or more credit card accounts and one or more debit card accounts. Personal identification information 132 may include information associated with the user. In some embodiments, personal identification information 132 may include a name, home address, billing address, mailing address, telephone number, e-mail address, social security number, and the like. Fraud metrics 134 may correspond to one or more user-specific metrics to be used in an overall fraud algorithm. For example, when fraud manager 124 determines that a fraud metric 134 should be adjusted based on information received from web browser extension 114, fraud manager 124 may instruct account handler 126 to update a particular fraud metric 134 accordingly.

Each third party web server 110 may be configured to host one or more websites 138 accessible to client device 102 via web browser 112. In some embodiments, each third party web server 110 may also host an account 136 corresponding to a user of client device 102. Account 136 may be accessible to client device 102 via web browser 112. In some embodiments, third party web server 110 may correspond to a financial institution, and account 136 may correspond to a user's financial account with the financial institution. In some embodiments, a third party web server 110 may correspond to a social media company, and account 136 may correspond to a user's social media account with the social media company. In some embodiments, a third party web server 110 may correspond to an email service provider, and account 136 may correspond to a user's email account with the email service provider.

Figure 2:
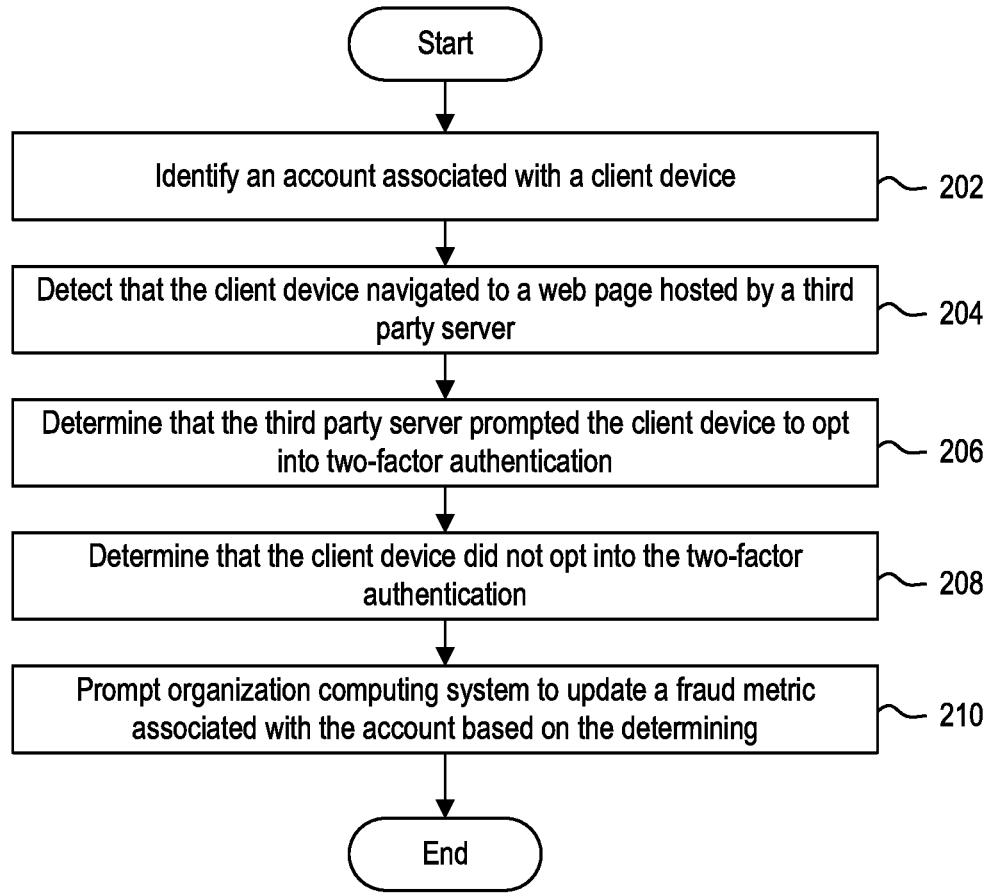
FIG. 2 is a flow diagram illustrating a method of assessing a fraud risk, according to example embodiments.

FIG. 2 is a flow diagram illustrating a method 200 of assessing a fraud risk, according to example embodiments. Method 200 may begin at step 202.

At step 202, web browser extension 114 may identify an account associated with client device 102. For example, web browser extension 114 may determine that client device 102 has logged into an account managed by organization computing system 106. In some embodiments, client device 102 may log into the account via web browser extension 114 such that any time client device 102 executes web browser 112, a user of client device 102 is logged into an account with organization computing system 106. The indication may include one or more parameters associated with the user's account, such as, but not limited to, account number, user name, password, and the like.

At step 204, web browser extension 114 may detect that client device 102 navigated to a web page hosted by a third party web server 110. Web browser extension 114 may scan a given webpage to locate identifying information corresponding to the web page. Such information may include, for example, identifiers corresponding to a facility, organization, or service associated with third party web server 108, a uniform resource locator (URL) of the web page, and the like. In some embodiments, handler 116 may be configured to identify a type of organization associated with the web page based on one or more identifiers in the script of the web page. For example, using the script of the web page, handler 116 may be able to determine that the web page is associated with a financial organization (e.g., bank, loan provider, credit card company, etc.), a social media organization, and the like.

At step 206, web browser extension 114 may determine that third party web server 108 prompted client device 102 to opt into two-factor authentication functionality. For example, handler 116 may review the script (e.g., HTML, XML) of the web page for one or more fields associated with two-factor authentication functionality. For example, handler 116 may review one or more identifiers for prompts in the script to search for identifiers pertaining to two-factor authentication functionality. Upon detecting such identifiers, handler 116 may identify whether the user has, for example, two-factor authentication functionality turned on, ignored a prompt to opt into two-factor authentication functionality, navigated to a web page to opt into two-factor authentication functionality, and the like.

At step 208, web browser extension 114 may determine that client device 102 did not opt into two-factor authentication functionality. For example, based on a review of the script of the web page by handler 116, handler 116 may determine that client device 102 was prompted with a two-factor authentication request, and chose not to opt into two-factor authentication functionality. In another example, based on a review of the script of the web page by handler 116, handler 116 may determine that client device 102 was prompted with a log-in screen, and web page did not update to prompt user to select a means of further authentication (e.g., text message, email, phone call, etc.).

At step 210, web browser extension 114 may prompt organization computing system 106 to update a fraud metric associated with user profile 128 based on the determining. In some embodiments, web browser extension 114 may prompt organization computing system 106 via API module 118 that interfaces with web browser extension module 125. For example, based on determining that the user either has not opted into two-factor authentication or was prompted to opt into two-factor authentication functionality and failed to do so, API module 118 may prompt organization computing system 106 to increase a sensitivity of a fraud metric. Web browser extension module 125 may prompt fraud manager 124 to increase a sensitivity of a fraud metric 134 associated with user profile 128. In some embodiments, the degree to which fraud manager 124 increases the sensitivity of fraud metric may be based on a type of organization, facility, or service associated with the web page. For example, if at step 204, web browser extension 114 determines that the web page is a financial institution, then fraud manager 124 may increase the sensitivity of fraud metric 134 a greater amount compared to if web browser extension 114 determined that the web page is a social media account. By increasing the sensitivity of fraud metric 134, fraud manager 124 may guard against a greater likelihood of an account 130 becoming compromised because safeguards, such as two-factor authentication functionality, are not taken by the user.

Figure 3:
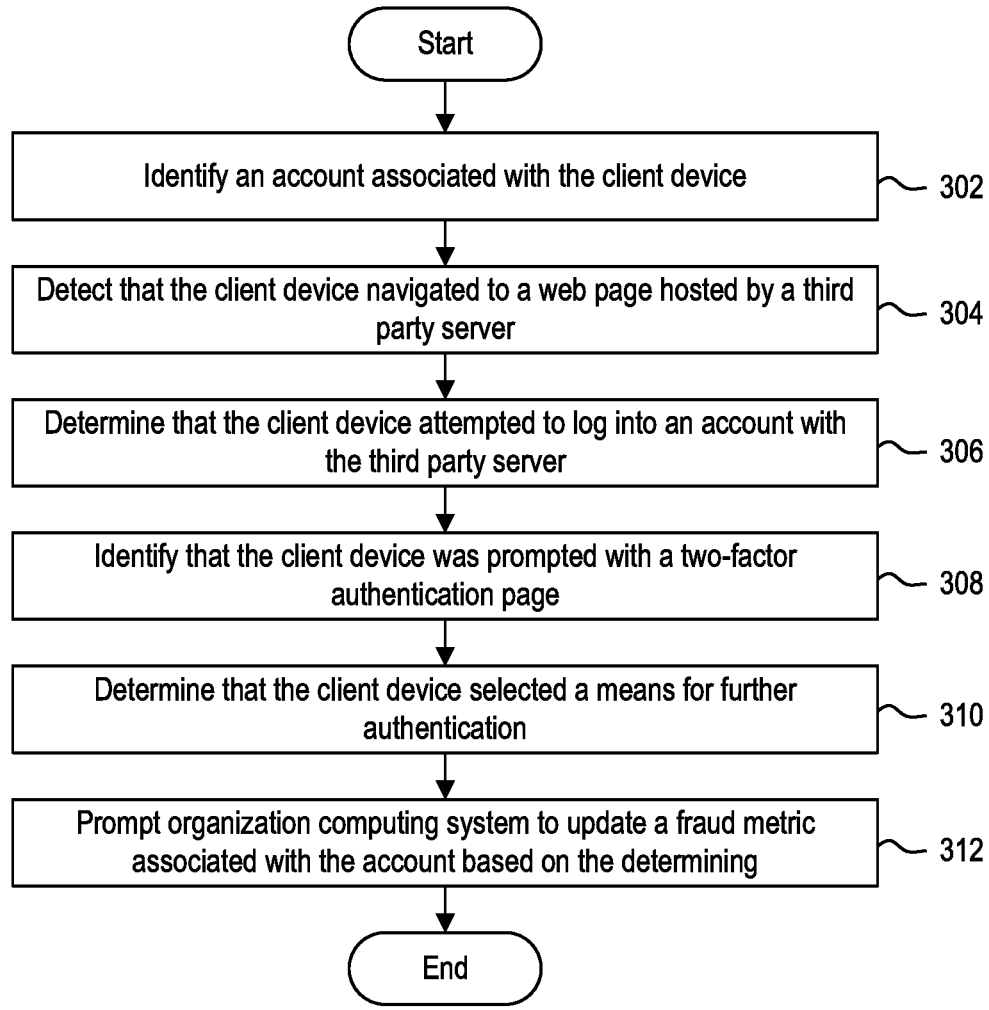
FIG. 3 is a flow diagram illustrating a method of assessing a fraud risk, according to example embodiments.

FIG. 3 is a flow diagram illustrating a method 300 of assessing a fraud risk, according to example embodiments. Method 300 may begin at step 302.

At step 302, web browser extension 114 may identify an account associated with client device 102. For example, web browser extension 114 may determine that client device 102 has logged into an account managed by organization computing system 106. In some embodiments, client device 102 may log into the account via web browser extension 114 such that any time client device 102 executes web browser 112, a user of client device 102 is logged into an account with organization computing system 106. The indication may include one or more parameters associated with the user's account, such as, but not limited to, account number, user name, password, and the like.

At step 304, web browser extension 114 may detect that client device 102 navigated to a web page hosted by a third party web server 108. Web browser extension 114 may scan a given webpage to locate identifying information corresponding to the web page. Such information may include, for example, identifiers corresponding to a facility, organization, or service associated with third party web server 108, a uniform resource locator (URL) of the web page, and the like. In some embodiments, handler 116 may be configured to identify a type of organization associated with the web page based on one or more identifiers in the script of the web page. For example, using the script of the web page, handler 116 may be able to determine that the web page is associated with a financial organization (e.g., bank, loan provider, credit card company, etc.), a social media organization, and the like.

At step 306, web browser extension 114 may determine that the user attempted to log into account 136 with third party web server 110. For example, handler 116 may review the script (e.g., HTML, XML) of the web page for one or more fields associated with a log-on attempt. For example, handler 116 may review one or more identifiers for one or more fields in the script to identify whether the user is attempting to log-in to an account 136 hosted by third party web server 110.

At step 308, web browser extension 114 may identify that client device 102 was prompted with a two-factor authentication page. For example, handler 116 may review the script (e.g., HTML, XML) of the web page for one or more fields that may indicate a two-factor authentication prompt. For example, handler 116 may review one or more identifiers for one or more fields in the script to identify whether the user was presented with an option for two-factor authentication when attempting to log-in to an account 136 hosted by third party web server 110.

At step 310, web browser extension 114 may determine that client device 102 selected a means for further authentication. For example, based on a review of the script of the web page by handler 116, handler 116 may determine that client device 102 was prompted with a two-factor authentication request, and selected a channel through which the user may further authenticate with third party web server 110. In some embodiments, handler 116 may determine that the user was presented with a web page that prompted the user to select a means of further authentication (e.g., text message, email, phone call, etc.), and that the user selected an option.

At step 312, web browser extension 114 may prompt organization computing system 106 to update a fraud metric associated with user profile 128 based on the determining. In some embodiments, web browser extension 114 may prompt organization computing system 106 via API module 118 that interfaces with web browser extension module 125. For example, based on determining that the user has opted into two-factor authentication, based on identifying the selection for further authentication, API module 118 may prompt organization computing system 106 to decrease a sensitivity of a fraud metric 134 associated with user profile 128. In some embodiments, the degree to which fraud manager 124 decreases the sensitivity of fraud metric may be based on a type of organization, facility, or service associated with the web page. In some embodiments, rather than adjusting a sensitivity of a fraud metric 134, fraud manager 124 may not update any fraud metric 134 associated with user profile 128.

Figure 4:
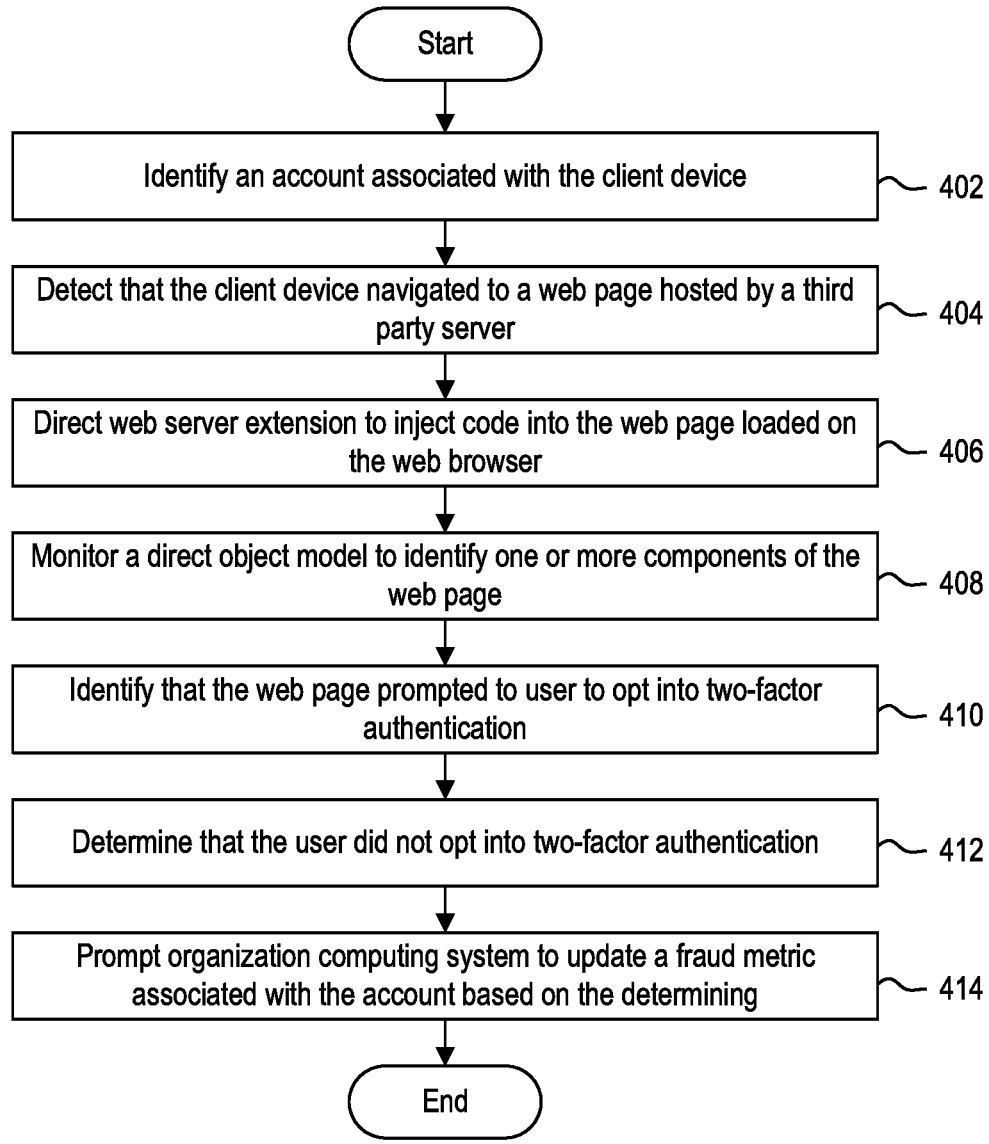
FIG. 4 is a flow diagram illustrating a method of assessing a fraud risk, according to example embodiments.

FIG. 4 is a flow diagram illustrating a method 400 of assessing a fraud risk, according to example embodiments. Method 400 may begin at step 402.

At step 402, web browser extension 114 may identify an account associated with client device 102. For example, web browser extension 114 may determine that client device 102 has logged into an account managed by organization computing system 106. In some embodiments, client device 102 may log into the account via web browser extension 114 such that any time client device 102 executes web browser 112, a user of client device 102 is logged into an account with organization computing system 106. The indication may include one or more parameters associated with the user's account, such as, but not limited to, account number, user name, password, and the like.

At step 404, web browser extension 114 may detect that client device 102 navigated to a web page hosted by a third party web server 108. Web browser extension 114 may scan a given webpage to locate identifying information corresponding to the web page. Such information may include, for example, identifiers corresponding to a facility, organization, or service associated with third party web server 108, a uniform resource locator (URL) of the web page, and the like. In some embodiments, handler 116 may be configured to identify a type of organization associated with the web page based on one or more identifiers in the script of the web page. For example, using the script of the web page, handler 116 may be able to determine that the web page is associated with a financial organization (e.g., bank, loan provider, credit card company, etc.), a social media organization, and the like.

At step 406, web browser extension 114 may inject code (e.g., HTML, XML, JavaScript) into the script of the web page. For example, web browser extension 114 may inject additional code into the script of the web page, such that the code associated with web browser extension 114 runs side-by-side with the code in the script of the web page.

At step 408, web browser extension 114 may monitor a direct object model to identify one or more components of the web page. For example, handler 116 may parse through the direct object model of the web page to identify one or more identifiers, fields, and, generally, the overall structure of the web page.

At step 410, web browser extension 114 may determine that third party web server 108 prompted client device 102 to opt into two-factor authentication functionality. For example, handler 116 may review the script (e.g., HTML, XML) of the web page for one or more fields associated with two-factor authentication functionality. For example, handler 116 may review one or more identifiers for prompts in the script to search for identifiers pertaining to two-factor authentication functionality. Upon detecting such identifiers, handler 116 may identify whether the user has, for example, two-factor authentication functionality turned on, ignored a prompt to opt into two-factor authentication functionality, navigated to a web page to opt into two-factor authentication functionality, and the like.

At step 412, web browser extension 114 may determine that client device 102 did not opt into two-factor authentication functionality. For example, based on a review of the script of the web page by handler 116, handler 116 may determine that client device 102 was prompted with a two-factor authentication request, and chose not to opt into two-factor authentication functionality. In another example, based on a review of the script of the web page by handler 116, handler 116 may determine that client device 102 was prompted with a log-in screen, and web page did not update to prompt user to select a means of further authentication (e.g., text message, email, phone call, etc.).

At step 414, web browser extension 114 may prompt organization computing system 106 to update a fraud metric associated with user profile 128 based on the determining. In some embodiments, web browser extension 114 may prompt organization computing system 106 via API module 118 that interfaces with web browser extension module 125. For example, based on determining that the user either has not opted into two-factor authentication or was prompted to opt into two-factor authentication functionality and failed to do so, API module 118 may prompt organization computing system 106 to increase a sensitivity of a fraud metric 134 associated with user profile 128. In some embodiments, the degree to which fraud manager 124 increases the sensitivity of fraud metric may be based on a type of organization, facility, or service associated with the web page. For example, if at step 404, fraud manager 124 determines that the web page is a financial institution, then fraud manager 124 may increase the sensitivity of fraud metric 134 a greater amount compared to if fraud manager 124 determined that the web page is a social media account. By increasing the sensitivity of fraud metric 134, fraud manager 124 may guard against a greater likelihood of an account 130 becoming compromised because safeguards, such as two-factor authentication functionality, are not taken by the user.

Figure 5:
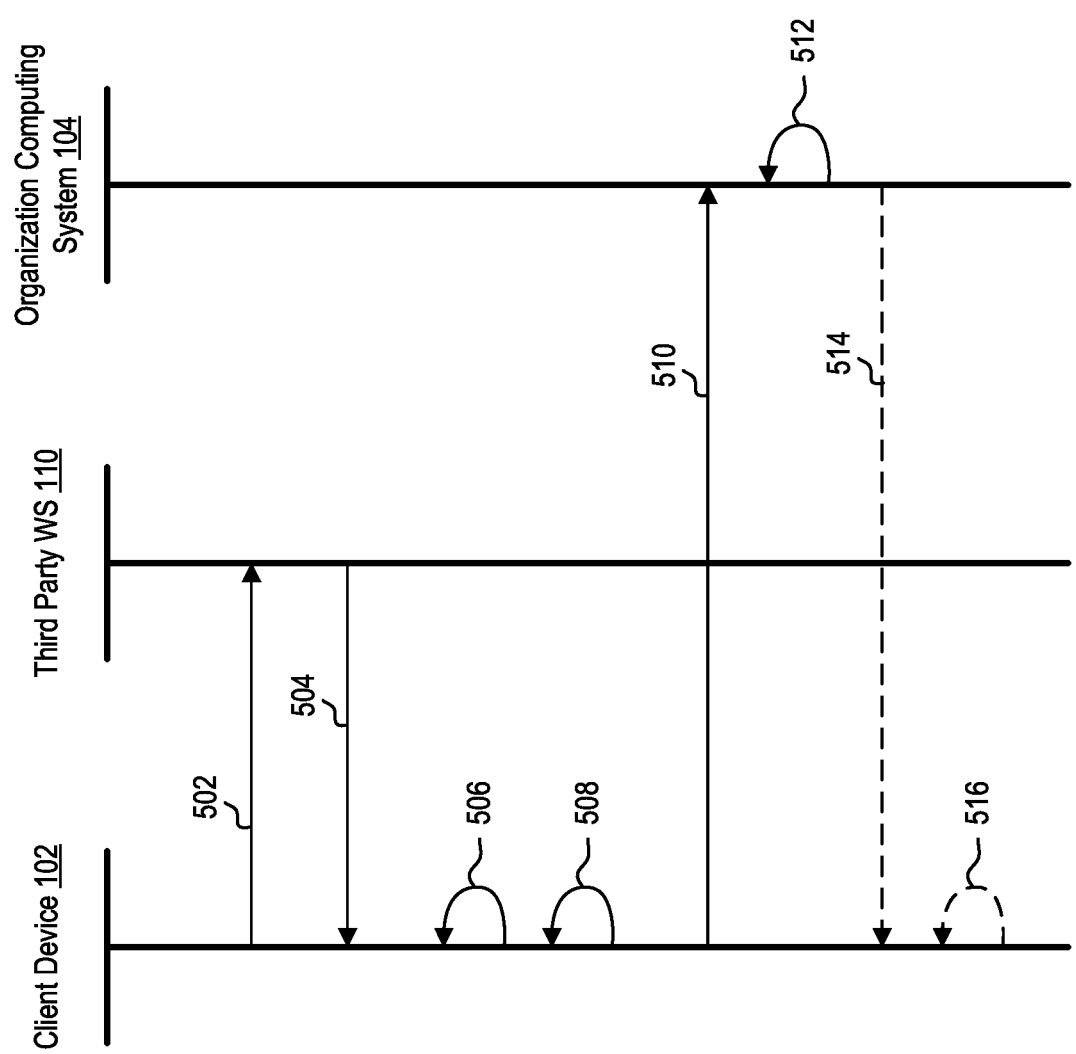
FIG. 5 is a block diagram illustrating one or more components of the computing system in FIG. 1 interacting to assess a fraud risk, according to example embodiments.

FIG. 5 is a block diagram 500 illustrating one or more components of computing system 100 in FIG. 1 interacting to assess a fraud risk, according to example embodiments.

At operation 502, client device 102 may request a web page from third party web server 110 (illustrated as "third party WS 110"). For example, user of client device 102 may enter a URL of a web page or web site into web browser 112 executing thereon. Web browser 112 may, in turn, request the web page or web site from third party web server 110.

At operation 504, third party web server 110 may transmit the requested web page to client device 102. For example, third party web server 110 may transmit the requested web page to web browser 112 for rendering.

At operation 506, web browser 112 may render the web page such that client device 102 can display the rendered web page via a display associated with client device 102. At operation 508, web browser extension 114 may determine that third party web server 110 prompted client device 102 to opt into two-factor authentication functionality. In some embodiments, web browser extension 114 may determine that client device 102 did not opt into two-factor authentication functionality. In some embodiments, web browser extension 114 may determine that client device 102 opted into two-factor authentication functionality.

At operation 510, via an API, web browser extension 114 may transmit one or more instructions to organization computing system 106. For example, web browser extension 114 may instruct account fraud manager 124 of organization computing system 106 to update a fraud parameter 134 based on the detection at operation 508. At operation 512, organization computing system may update the fraud parameter 134 in accordance with the instructions.

At operation 514, in some embodiments, organization computing system 106 may generate a recommendation to be transmitted to client device 102. For example, in response to determining that the user has not turned on two-factor authentication functionality, organization computing system 106 may generate a message recommending that the user take advantage of two-factor authentication, when available. Organization computing system 106 may transmit the message to web browser extension 114. At operation 516, web browser extension 114 may push the message to client device 102.

Figure 6:
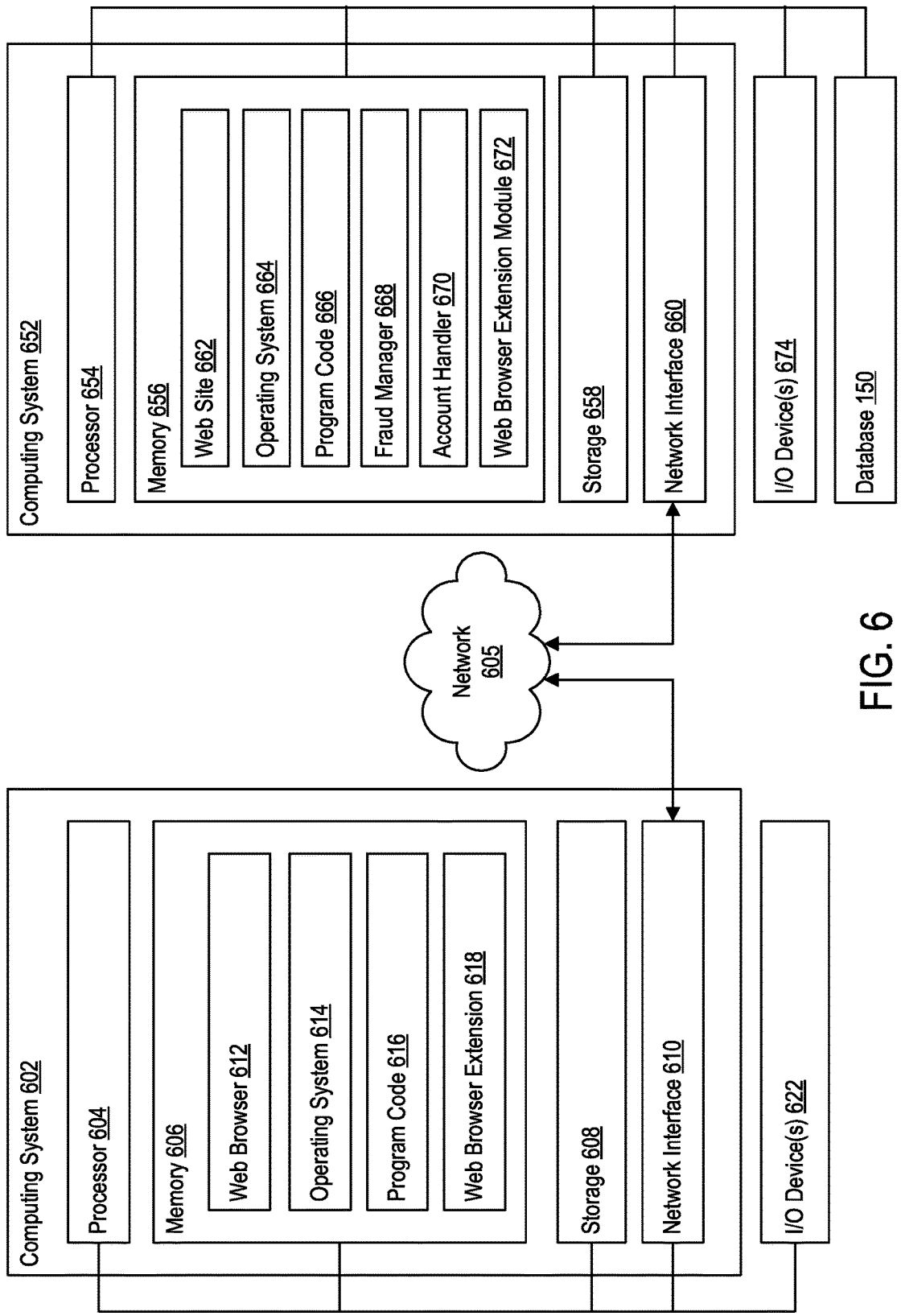
FIG. 6 is a block diagram illustrating a computing environment, according to example embodiments.

FIG. 6 is a block diagram illustrating an exemplary computing environment 600, according to some embodiments. Computing environment 600 includes computing system 602 and computing system 652. Computing system 602 may be representative of client device 102. Computing system 652 may be representative of organization computing system 106.

Computing system 602 may include a processor 604, a memory 606, a storage 608, and a network interface 610. In some embodiments, computing system 602 may be coupled to one or more I/O device(s) 622 (e.g., keyboard, mouse, etc.).

Processor 604 may retrieve and execute program code 616 (i.e., programming instructions) stored in memory 606, as well as stores and retrieves application data. Processor 604 may be included to be representative of a single processor, multiple processors, a single processor having multiple processing cores, and the like. Network interface 610 may be any type of network communications allowing computing system 602 to communicate externally via computing network 605. For example, network interface 610 is configured to enable external communication with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include web browser 612, operating system 614, program code 616, and web extension 618. Program code 616 may be accessed by processor 604 for processing (i.e., executing program instructions). Program code 616 may include, for example, executable instructions for communicating with computing system 652.

Web browser 612 may be one or more software applications configured to perform operations consistent with providing web pages. In operation, computing system 602 may communicate network 605 to request a webpage, for example, from one or more third party web servers or access functionality associated with computing system 652. The content that is displayed to computing system 602 may be transmitted from a third party web server to client device 602, and subsequently processed by web browser 612 for display through a display associated with a computing system 602.

Web browser extension 618 may work in conjunction with web browser 612. For example, web browser extension 618 may be one or more software applications configured to perform operations consistent with detecting fields in web pages, such as payment fields in web pages associated with merchants. Web browser extension 618 may be further configured to perform operations consistent with populating fields in web pages with, for example, secure tokens mapped to financial service accounts. Web browser extension 618 may be further configured to detect whether a user of computing system 602 has opted into two-factor authentication with one or more third party web servers.

Computing system 652 may include a processor 654, a memory 656, a storage 658, and a network interface 660. In some embodiments, computing system 652 may be coupled to one or more I/O device(s) 672.

Processor 654 may retrieve and execute program code 666 (i.e., programming instructions) stored in memory 656, as well as stores and retrieves application data. Processor 654 is included to be representative of a single processor, multiple processors, a single processor having multiple processing cores, and the like. Network interface 660 may be any type of network communications enabling computing system 652 to communicate externally via computing network 605. For example, network interface 660 allows computing system 652 to communicate with computer system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include web site 662, operating system 664, program code 666, fraud manager 668, account handler 670, and web browser extension module 672. Program code 666 may be accessed by processor 654 for processing (i.e., executing program instructions). Program code 666 may include, for example, executable instructions configured to perform steps discussed above in conjunction with FIGS. 2-5. As an example, processor 654 may access program code 666 to perform operations for assessing a fraud risk.

Web browser extension module 672 may be configured to interface with web browser extension 618 via one or more APIs. For example, web browser extension 618 may communicate client security information with web browser extension module 672 via one or more APIs to notify computing system 652 whether, for example, the user has opted into two-factor authentication for various websites.

Web browser extension module 672 may communicate such information to fraud manager 668. Fraud manager 668 may use such information (e.g., client security information) as part of an overall fraud algorithm. For example, upon receiving an indication that the user has not opted into two-factor authentication for a particular website, fraud manager 668 may update a fraud metric in the fraud algorithm. In this case, fraud manager 668 may increase a sensitivity of the fraud metric in the fraud algorithm, such that the fraud algorithm may be more sensitive to potential fraudulent transactions.

Account handler 670 may be configured to manage one or more user profiles in database 150. For example, account handler 670 may update a fraud metric associated with a user profile, based on one or more instructions from fraud manager 668.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method for assessing a fraud risk, comprising:
   identify, by a web browser extension executing on a computing device, an account associated with the computing device;
   based on the identifying, detecting, by the web browser extension, that the computing device navigated to a web page hosted by a third party server;
   determining, by the web browser extension, that the third party server prompted the computing device to opt into two-factor authentication functionality during a log-in operation on the web page;
   determining, by the web browser extension, that the computing device did not opt into the two-factor authentication functionality; and
   based on the determining, prompting, by the browser extension via an application programming interface (API), an organization computing system to update a fraud metric associated with the account without preventing the computing device from a the web page hosted by the third party server.

2. The method of claim 1, wherein, prompting, by the browser extension application via the API, the organization computing system to update the fraud metric associated with the account, comprises:
   increasing a sensitivity of a fraud algorithm associated with the account.

3. The method of claim 2, wherein increasing the sensitivity of the fraud algorithm associated with the account, comprises:
   determining that a type of website is a website associated with a financial institution; and
   increasing the sensitivity of the fraud algorithm associated with the account by a first amount.

4. The method of claim 2, wherein increasing the sensitivity of the fraud algorithm associated with the account, comprises:
   determining that a type of website is a website not associated with a financial institution; and
   increasing the sensitivity of the fraud algorithm with the account by a first amount that is less than an amount associated with a financial institution website.

5. The method of claim 1, further comprising:
   receiving, at the browser extension application, a message from the organization computing system to be transmitted to the computing device, the message comprising a suggestion to opt into two-factor authentication functionality; and
   prompting, by the web browser extension, a user of the computing device to opt into the two-factor authentication functionality.

6. The method of claim 5, further comprising:
   detecting, by the web browser extension, that the computing device has opted into the two-factor authentication functionality following receipt of the message; and
   prompting, by the web browser extension via the API, the organization computing system to further update the fraud metric associated with the account.

7. The method of claim 6, wherein, prompting, by the web browser extension via the API, the organization computing system to further update the fraud metric associated with the account, comprises:
   decreasing a sensitivity of a fraud algorithm associated with the account.

8. A system, comprising:
   a processor executing a web browser extension; and
   a memory having programming instructions and the web browser extension stored thereon, the web browser extension, when executed by the processor, performs an operation, comprising:
     identifying, by the web browser extension, an indication of an account associated with a computing device;
     based on the identifying, detecting, by the web browser extension, that the computing device navigated to a web page hosted by a third party server;
     determining, by the web browser extension, that the third party server prompted the computing device to perform an authorization operation during a log-in operation on the web page;
     determining, by the web browser extension, that the authorization operation with the third party server does not include two-factor authentication functionality; and
     based on the determining, prompting, by the web browser extension via an application programming interface (API), an organization computing system to update a fraud metric associated with the account without preventing the computing device from accessing the web page hosted by the third party server.

9. The system of claim 8, wherein, prompting, by the web browser extension via the API, the organization computing system to update the fraud metric associated with the account, comprises:
   increasing a sensitivity of a fraud algorithm associated with the account.

10. The system of claim 9, wherein increasing the sensitivity of the fraud algorithm associated with the account, comprises:
    determining that a type of website is a website associated with a financial institution; and
    increasing the sensitivity of the fraud algorithm associated with the account by a first amount.

11. The system of claim 9, wherein increasing the sensitivity of the fraud algorithm associated with the account, comprises:
    determining that a type of website is a website not associated with a financial institution; and
    increasing the sensitivity of the fraud algorithm with the account by a first amount that is less than an amount associated with a financial institution website.

12. The system of claim 8, further comprising:
    receiving a message from the organization computing system to be transmitted to the computing device, the message comprising a suggestion to opt into two-factor authentication functionality; and prompting, by the web browser extension, a user of the computing device to opt into two-factor authentication functionality.

13. The system of claim 12, further comprising:
    detecting, by the web browser extension, that the computing device has opted into the two-factor authentication functionality following receipt of the message; and
    prompting, by the web browser extension via the API, the organization computing system to further update the fraud metric associated with the account.

14. The system of claim 12, wherein, prompting, by the browser extension application via the API, the organization computing system to further update the fraud metric associated with the account, comprises:
    decreasing a sensitivity of a fraud algorithm associated with the account.

15. A method for assessing a fraud risk, comprising:
    identifying, by a web browser extension executing on a computing device, an account associated with the computing device;
    based on the identifying, detecting, by the web browser extension, that the computing device navigated to a web page hosted by a third party server;
    identifying, by the web browser extension, a document object model generated by a web browser executing on the computing device;
    parsing, by the web browser extension, the document object model to determine whether the computing device has opted into two-factor authentication functionality with the third party web server during a log-in operation on the web page;
    determining, by the web browser extension, that the computing device did not opt into the two-factor authentication functionality; and
    based on the determining, notifying, by the web browser extension, an organization computing system that the computing device did not opt into the two-factor authentication functionality without preventing the computing device from accessing the web page hosted by the third party server.

16. The method of claim 15, wherein the document object model is an object oriented representation of the web page.

17. The method of claim 15, wherein parsing, by the web browser extension, the document object model to determine whether the computing device has opted into the two-factor authentication functionality with the third party web server, comprises:
    injecting, by the web browser extension, JavaScript associated therewith into the web page.

18. The method of claim 15, wherein determining, by the web browser extension, that the computing device did not opt into the two-factor authentication functionality, comprises:
    identifying a pop-up window corresponding to an authorization request between the computing device and the third party server; and
    determining that the authorization request did not include instructions for the two-factor authentication functionality.

19. The method of claim 15, further comprises:
    receiving, by the web browser extension from the organization computing system, a message to be displayed to the computing device, the message comprising a suggestion to opt into the two-factor authentication functionality; and
    requesting, by the web browser extension, that the web browser render the message for display.

20. The method of claim 19, further comprising:
    determining, by the web browser extension, that the computing device opted into the two-factor authentication functionality; and
    notifying, by the web browser extension, the organization computing system that the computing device opted into the two-factor authentication functionality.

* * * * *